US012785795B2

(12) United States Patent
Fan

(10) Patent No.: US 12,785,795 B2
(45) Date of Patent: Nov. 3, 2026

(54) FREQUENCY PRIORITY CONFIGURATION METHOD AND TERMINAL DEVICE

(71) Applicant: GUANGDONG OPPO MOBILE TELECOMMUNICATIONS CORP., LTD., Dongguan (CN)

(72) Inventor: Jiangsheng Fan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 540 days.

(21) Appl. No.: 18/459,082

(22) Filed: Aug. 31, 2023

(65) Prior Publication Data

US 2023/0412258 A1 Dec. 21, 2023

Related U.S. Application Data

(63) Continuation of application No. PCT/CN2021/078896, filed on Mar. 3, 2021.

(51) Int. Cl.
*H04B 7/185* (2006.01)

(52) U.S. Cl.
CPC ..... *H04B 7/18539* (2013.01); *H04B 7/18513* (2013.01)

(58) Field of Classification Search
None
See application file for complete search history.

(56) References Cited

U.S. PATENT DOCUMENTS

2019/0319686 A1* 10/2019 Chen, IV ............. H04B 7/0617
2019/0373544 A1* 12/2019 Hu ........................ H04W 48/20
2022/0400420 A1* 12/2022 Johansson ............. H04W 48/20
2024/0063894 A1* 2/2024 Vogedes ............. H04B 7/18504

FOREIGN PATENT DOCUMENTS

CN 102651879 A 8/2012
CN 108702666 A 10/2018
CN 110536369 A 12/2019
CN 110753401 A 2/2020
CN 112020094 A 12/2020

OTHER PUBLICATIONS

3GPP TS 38.331 3rd Generation Partnership Project;Technical Specification Group Radio Access Network;NR;Radio Resource Control (RRC) protocol specification(Release 16)(929 pages).
3GPP TS 38.304 3rd Generation Partnership Project; Technical Specification Group Radio Access Network;NR;User Equipment (UE) procedures in Idle mode and RRC Inactive state(Release 16)(37 pages).
International Search Report and Written Opinion for International Application No. PCT/CN2021/078896, mailed Dec. 3, 2021 (14 pages).

* cited by examiner

*Primary Examiner* — Diane L Lo
(74) *Attorney, Agent, or Firm* — Ladas & Parry LLP

(57) ABSTRACT

Provided in the embodiments of the present disclosure are a communication method and a terminal device. The method includes obtaining, by a terminal device, a priority relationship between a priority of at least one neighboring cell frequency and a priority of a serving cell frequency. The priority relationship includes the priority of a first neighboring cell frequency being higher or lower than the priority of the serving cell frequency, the at least one neighboring cell frequency including the first neighboring cell frequency. In this way, configuration flexibility may be improved.

18 Claims, 3 Drawing Sheets

300

FREQUENCY PRIORITY CONFIGURATION METHOD AND TERMINAL DEVICE

CROSS REFERENCE

The present disclosure is a continuation-application of International (PCT) Patent Application No. PCT/CN2021/078896, filed on Mar. 3, 2021, the entire contents of which are hereby incorporated by reference in their entirety.

TECHNICAL FIELD

The present disclosure relates to the field of communication technologies, and in particular to a communication method, and a terminal device.

BACKGROUND

With the development of mobile communication systems, satellites can be used as access network devices to provide network services for terrestrial terminals. Unlike the terrestrial base stations fixed on the ground, medium earth orbiting (MEO) satellites and low earth orbiting (LEO) satellites move at a high speed relative to the ground (generally, MEO/LEO satellites move at a speed of several kilometers per second). Since the motion speed of the terminal is negligible relative to the motion speed of the satellite, the time of a satellite serving the terminal varies from about a few seconds to a few minutes time; in other words, the satellites serving the terminal change every interval. On the other hand, for MEO/LEO satellites, the change of the satellites serving the terminal after a period of time is generally mandatory and unidirectional, because the satellites will always move relative to the ground and in a fixed direction. However, in current communication systems, the relevant configurations for cell selection or cell reselection are designed for terrestrial base stations, and their applicability is limited for cases where there is relative motion between the network device and the ground, and there is still room for improvement.

SUMMARY OF THE DISCLOSURE

Embodiments of the present disclosure provide a communication method, and a terminal device.

In a first aspect, the present disclosure provides a communication method, including: obtaining, by a terminal device, a priority relationship between a priority of at least one neighboring cell frequency and a priority of a serving cell frequency; wherein the priority relationship includes the priority of a first neighboring cell frequency being higher or lower than the priority of the serving cell frequency, the at least one neighboring cell frequency including the first neighboring cell frequency.

In a second aspect, the present disclosure provides a communication method, including: sending first configuration information to a terminal device; wherein the first configuration information is configured to indicate a priority relationship between a priority of at least one neighboring cell frequency and a priority of a serving cell frequency; wherein the priority relationship includes the priority of a first neighboring cell frequency being higher or lower than the priority of the serving cell frequency, the at least one neighboring cell frequency including the first neighboring cell frequency.

In third second aspect, the present disclosure provides a terminal device, including: an obtaining unit, configured to obtain a priority relationship between a priority of at least one neighboring cell frequency and a priority of a serving cell frequency; and a processing unit, configured to determine that the priority of a first neighboring cell frequency is higher or lower than the priority of the serving cell frequency based on the priority relationship; wherein the at least one neighboring cell frequency includes the first neighboring cell frequency.

In a fourth aspect, the present disclosure provides a network device, including: a processing unit, configured to determine a priority relationship between a priority of at least one neighboring cell frequency and a priority of a serving cell frequency; wherein the priority relationship includes the priority of a first neighboring cell frequency being higher or lower than the priority of the serving cell frequency, the at least one neighboring cell frequency including the first neighboring cell frequency; and a transceiver unit, configured to send first configuration information to a terminal device; wherein the first configuration information is configured to indicate the priority relationship.

In a fifth aspect, the present disclosure provides a terminal device, including: a processor, a memory, and an interface for communication with a terminal device; wherein the memory stores computer executable instructions; when the processor executes the computer executable instructions, the processor is caused to perform the communication method according to any one of the first aspect.

In a sixth aspect, the present disclosure provides a network device, including: a processor, a memory, and an interface for communication with a terminal device; wherein the memory stores computer executable instructions; when the processor executes the computer executable instructions, the processor is caused to perform the communication method according to any one of the second aspect.

In a seventh aspect, the present disclosure provides a computer-readable storage medium, storing a computer program; wherein when the computer program is executed by one or more processors, the one or more processors are caused to perform the communication method according to any one of the first aspect.

In an eighth aspect, the present disclosure provides a computer-readable storage medium, storing a computer program; wherein when the computer program is executed by one or more processors, the one or more processors are caused to perform the communication method according to any one of the second aspect.

In a ninth aspect, the present disclosure provides a program; wherein the program is configured to perform the communication method according to any one of the first aspect when executed by a processor.

In a tenth aspect, the present disclosure provides a program; wherein the program is configured to perform the communication method according to any one of the second aspect when executed by a processor.

In some embodiments, the processor may be a chip.

In an eleventh aspect, the present disclosure provides a computer program product, including a computer program; wherein the computer program is executed, a computer is caused to perform the communication method according to any one of the first aspect.

In a twelfth aspect, the present disclosure provides a computer program product, including a computer program; wherein the computer program is executed, a computer is caused to perform the communication method according to any one of the second aspect.

In a thirteenth aspect, the present disclosure provides a chip, including a processing module and a communication interface; wherein the processing module can perform the communication method according to any one of the first aspect.

Further, the chip further includes a memory module (e.g., a memory), the memory module for storing instructions, the processing module for executing the instructions stored in the memory module to be caused to perform the communication method according to any one of the first aspect.

In a fourteenth aspect, the present disclosure provides a chip, including a processing module and a communication interface; wherein the processing module can perform the communication method according to any one of the second aspect.

Further, the chip further includes a memory module (e.g., a memory), the memory module for storing instructions, the processing module for executing the instructions stored in the memory module to be caused to perform the communication method according to any one of the second aspect.

DETAILED DESCRIPTION

In order to make the purpose, technical solutions and advantages of the embodiments of the present disclosure clearer, the technical solutions in the embodiments of the present disclosure will be described clearly and completely below in conjunction with the accompanying drawings in the embodiments of the present disclosure, and it is clear that the embodiments described are a part of the embodiments of the present disclosure and not all of them. Based on the embodiments in the present disclosure, all other embodiments obtained by those skilled in the art without making creative labor fall within the scope of the present disclosure.

The terms "first", "second", etc. in the specification, claims and the drawings of the embodiments of the present disclosure are intended to distinguish similar objects and need not be used to describe a particular order or sequence. It is to be understood that the terms so described may be interchanged, where appropriate, such that the embodiments of the present disclosure described herein can be implemented, for example, in an order other than those illustrated or described herein. Further, the terms "including" and "having", and any variations thereof, are intended to cover non-exclusive inclusion, e.g., a process, method, system, product, or apparatus including a series of steps or units need not be limited to those steps or units clearly listed, but may include those that are not clearly listed. units, but may include other steps or units not clearly listed or inherent to the process, method, product, or apparatus.

The technical solutions of the embodiments of the present disclosure may be applied to various communication systems, such as code division multiple access (CDMA) system, wideband code division multiple access (WCDMA) system, general packet radio service (GPRS), long term evolution (LTE) system, enhanced LTE (LTE-Advanced, LTE-A) system, LTE frequency division duplex (FDD) system, LTE time division duplex (FDD) system, LTE time division duplex (FDD) system, LTE time division duplex (TDD), universal mobile telecommunication system (UMTS), worldwide interoperability for microwave access (WiMAX) communication system, fifth generation (5G) communication system, new radio (NR) access technology, non-terrestrial network (NTN) system which can also be called satellite communication system, or future communication systems (such as sixth generation (6G) communication systems), or systems that integrate multiple communication systems, etc., which are not limited by the embodiments of the present disclosure.

Figure 1:
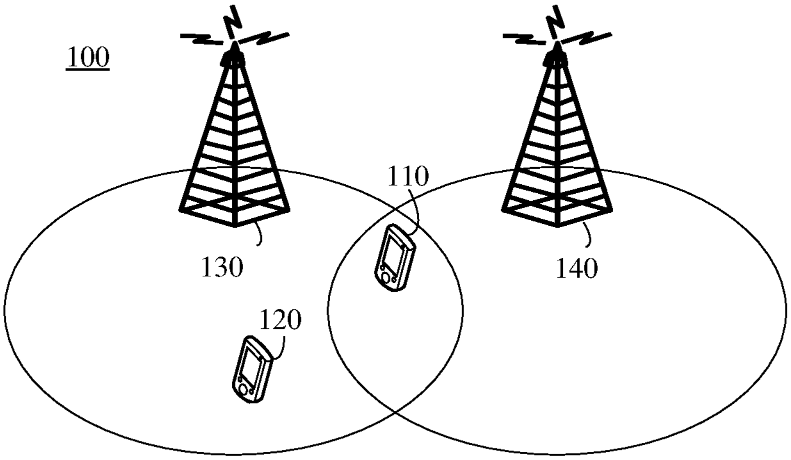
FIG. 1 is a schematic view of a wireless communication system according to an embodiment of the present disclosure.
Figure 2:
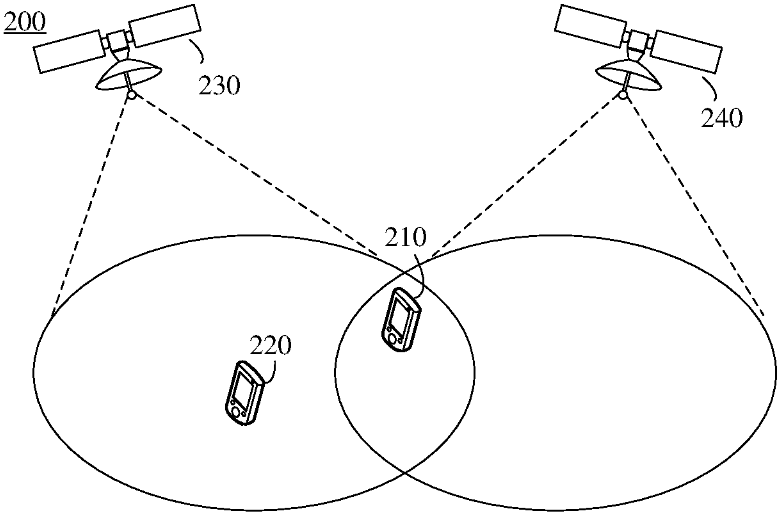
FIG. 2 is a schematic view of a wireless communication system according to another embodiment of the present disclosure.

FIGS. 1 and 2 are schematic views of the wireless communication system 100 and 200, respectively, applicable to the present embodiments.

The wireless communication system applicable to the present embodiments may include at least one network device, which may be erected on the ground, such as a network device 130 or a network device 140 in wireless communication system 100 shown in FIG. 1. The at least one network device may also be a satellite, such as a network device 230 or a network device 240 in the wireless communication system 200 shown in FIG. 2. Alternatively, the wireless communication system may include at least two network devices, including a built-on-ground network device and a satellite, without limitation in the present disclosure. The wireless communication system of the present embodiments may further include at least one terminal device, such as a terminal device 110 or a terminal device 120 in the wireless communication system 100 shown in FIG. 1, or a terminal device 210 or a terminal device 220 in the wireless communication system 200 shown in FIG. 2, without limitation in the present disclosure.

The terminal device in the embodiments of the present disclosure may also be referred to as user equipment (UE), an access terminal, a user unit, a user station, a mobile station, a mobile platform, a remote station, a remote terminal, a mobile device, a user terminal, a terminal, a wireless communication apparatus, a user agent, or a user apparatus. The terminal device in the embodiments of the present disclosure may be a mobile phone, a tablet computer (pad), a computer with wireless transceiver function, a virtual reality (VR) terminal device, an augmented reality (AR) terminal device, a wireless terminal in industrial control, a wireless terminal in unmanned driving, a wireless terminal in remote medical, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a handheld device with wireless communication capabilities, a computing device, or other processing devices, in-vehicle devices, and wearable devices connected to a wireless modem, a terminal device in 5G networks, or a terminal device in the future evolution of public land mobile network (PLMN), etc.

The wearable devices can also be called wearable smart devices, which is a general term for wearable devices that are intelligently designed and developed using wearable technology for everyday wear, such as glasses, gloves, watches, clothing, and shoes. The wearable device is a portable device that can be worn directly on the body or integrated into the user's clothing or accessories. The wearable device is not only a hardware device, but also can achieve powerful function through software support as well as data interaction and cloud interaction. Broadly speaking, the wearable smart device includes full-featured and large-sized devices that can achieve complete or partial functions without relying on smartphones, such as smart watches or smart glasses, as well as devices that only focus on a certain type of application (e.g., various types of physical signs monitoring) and need to be used with other devices such as smartphones, such as smart bracelets and smart jewelry.

In addition, the terminal device may also be a terminal device in an Internet of things (IoT) system. IoT is an important part of the future development of information technology, and its main technical feature is to connect the object to the network through communication technology, so as to achieve the intelligent network of human-computer interconnection and thing-thing interconnection.

It should be understood that the present disclosure does not limit the specific form of the terminal device.

The network device in the present embodiments may be any kind of device with wireless transceiver function. The device includes, but is not limited to: evolved node B (eNB), radio network controller (RNC), node B (NB), base station controller (BSC), base transceiver station (BTS), home base station (e.g., home evolved nodeB, or home node B, HNB), baseband unit (BBU), access point (AP), wireless relay node, wireless backhaul node, transmission point (TP) or transmission and reception point (TRP) in a wireless fidelity (WIFI) system, etc., and also a gNB or transmission point (TRP or TP) in a 5G (e.g. NR) system, or, also be a network node that constitutes a gNB or transmission point, such as a baseband unit (BBU), or, a distributed unit (DU), etc.

It should be understood that the present disclosure is not limited to the specific form of the network device.

The following is a brief introduction of the relevant technologies and terms involved in the present disclosure.

1) Overview of 5G Technology

Currently, the 3GPP International Standards Organization has started to develop 5G in response to the pursuit of speed, latency, high-speed mobility, energy efficiency, and the diversity and complexity of services in future life. The main application scenarios of 5G are enhanced mobile broadband (eMBB), ultra reliable low latency communications (URLLC), and massive machine type communications (mMTC).

The demand for eMBB, which still targets users' access to multimedia content, services, and data, is growing very rapidly. On the other hand, as eMBB may be deployed in different scenarios, such as indoor, urban, rural, etc., its capabilities and needs vary greatly, it cannot be generalized and must be analyzed in detail in the context of specific deployment scenarios. Typical applications of URLLC include: industrial automation, power automation, telemedicine operations (surgery), traffic safety and security, etc. Typical features of mMTC include: high connection density, small data volume, delay-insensitive services, low cost and long lifetime of modules, etc.

A new radio resource control (RRC) state, RRC_INACTIVE, is defined in the 5G network environment for the purpose of reducing null signaling and quickly restoring wireless connections and data services. This state is different from RRC_IDLE and RRC_CONNECTED states.

Idle state (RRC_IDLE): mobility is UE-based cell selection reselection, paging is initiated by CN, and paging area is configured by CN. There is no UE AS context on the base station side. No RRC connection exists.

Connected state (RRC_CONNECTED): RRC connection exists and UE AS context exists for the base station and UE. The network side knows the location of the UE is cell specific level. Mobility is network-side controlled mobility. Unicast data can be transmitted between the UE and the base station.

Inactive state (RRC_INACTIVE): mobility is UE-based cell selection reselection, connection between CN-NG-RAN exists, UE AS context exists on some base station, paging is triggered by RAN, paging area based on RAN is managed by RAN, and the network side knows the location of UE is based on RAN paging area level.

2) Frequency Priority

In the communication system, there may be more than one frequency point (or simply as frequency) corresponding to the neighboring cell around a cell. In order to perform load balancing and assist the idle or inactive terminal in cell selection/reselection measurement process, the communication system defines corresponding priority information for different frequency points, and the network side can configure the frequency priority information at the same time when configuring a frequency point. The frequency priority can also be called absolute frequency priority. The frequency priority takes the value of 0, 1, 2, 3, 4, 5, 6 or 7, where 0 represents the lowest priority, and 7 means the highest priority. In order to the diversity of frequency priority configuration, the standard provides that each value from 0 to 7 can be associated with a fractional value, and the fractional value range is {10.2, 0.4, 0.6, 0.81}. There are a total of 40 combinations of frequency priority for integer and fractional bit matching.

The frequency priority may be configured by system information or dedicated signaling. The frequency priority configured by dedicated signaling is associated with a valid time duration, and within the valid time duration, the dedicated frequency priority always overrides public frequency priority broadcasted by system information; when the valid time duration is exceeded, the terminal can only use the public frequency priority.

3) Cell Selection/Reselection Rules of a Terminal in a Terrestrial System

The cell selection/reselection process is only applicable to terminals in idle state or inactive state, as follows.

Cell selection: if the cell selected by the terminal meets an appropriate cell criterion, the terminal can choose to reside in the cell and complete cell selection.

Cell reselection: if a reselected target cell meets the appropriate cell criterion and meets a condition of reselection criterion defined based on the absolute frequency priority, the terminal performs reselection to the cell that meets the aforementioned condition and completes cell reselection.

The above reselection criterion defined based on the absolute frequency priority includes the following three.

High-priority frequency point cell reselection criterion;

Equal-priority frequency point cell reselection criterion or co-frequency reselection criterion, also called R criterion;

Low-priority frequency point cell reselection criterion;

4) Introduction to Satellite Cell Characteristics

Satellites can be divided into geosynchronous earth orbiting (GEO), medium earth orbiting (MEO), and low earth orbiting (LEO). GEO coverage diameter can reach thousands of kilometers (usually 3 satellites cover the entire earth), stationary relative to the ground. While the coverage diameter of MEO/LEO varies from tens of kilometers to thousands of kilometers depending on the orbit height, while the coverage diameter of terrestrial cells is usually only a few hundred meters to thousands of meters, and the coverage of satellite cells is much larger than that of terrestrial cells.

Since the effect of air drag on satellite motion is long-term (the daily orbit variation is small), in the short term, the orbit of satellite motion can be considered nearly constant. In other words, the orbits of all satellites are predictable in the short term, and the operational orbit information of satellites is usually referred to as ephemeris information.

For MEO/LEO satellites, unlike ground base stations fixed on the ground, they move at high speed relative to the ground (generally MEO/LEO satellites move at a speed of several kilometers per second). Because the motion speed of the terminal can be negligible relative to the motion speed of the satellite, the time of the satellite services the terminal varies from about a few seconds to a few minutes time, in other words, the satellite servicing the terminal changes every interval; on the other hand, for MEO/LEO satellites, after a period of time, the change of the satellite servicing the terminal is generally forced and unidirectional, because the satellites will always move relative to the ground and in a fixed direction. The continuous coverage of multiple satellites in the same direction enables continuous service to the same geographical area. According to the above description of satellite motion, the neighboring satellites that succeed a serving satellite are also directional, and since it is less likely that a satellite that has just left will provide service to the terminal again in a short period of time, usually the neighboring cell information broadcast by a satellite cell will only contain information about the upcoming satellite cell.

Based on the directional characteristics of satellite motion, setting the priority of the frequency point corresponding to the next satellite cell higher than the frequency priority of the previous satellite cell in the same motion direction is the most logical way, but the absolute frequency priority information of the neighboring frequency under this scheme will keep growing with the change of the serving satellite. Further, based on the absolute frequency point configuration of the current mobile communication system, the absolute frequency priority has an upper limit of 7.8, and it is obviously not feasible to always set the absolute frequency priority of a neighboring area higher than that of the serving cell in the satellite system. On the other hand, if the frequency priority of the next satellite cell is set equal to or lower than the frequency priority of the previous satellite cell in the motion direction, since the equal and lower priority frequency cell reselection criterion needs to consider signal measurements of both the serving cell and the neighboring cell, and the signal difference between the serving cell and the neighboring cell of the satellite system is not significant, the equal and lower priority frequency cell reselection criterion cannot work like terrestrial systems. Based on the above analysis, the priority configuration method of neighboring cell frequencies based on the absolute frequency priority is not suitable in satellite systems.

Therefore, the present disclosure proposes a method in which the terminal device obtains a relative priority relationship between a neighboring cell frequency and a serving cell frequency, such as obtaining the priority of the neighboring cell frequency higher or lower than the priority of the serving cell frequency, performs the neighboring cell measurement when a measurement condition is met and based on the obtained relative priority relationship of the frequency points, and determines the target cell for cell selection or cell reselection, thereby solving the problem of restricted configuration due to the absolute frequency priority, which improves the flexibility of configuration and applies to a wider range of scenarios.

The communication method provided in the present disclosure is illustrated below in conjunction with the accompanying drawings.

Figure 3:
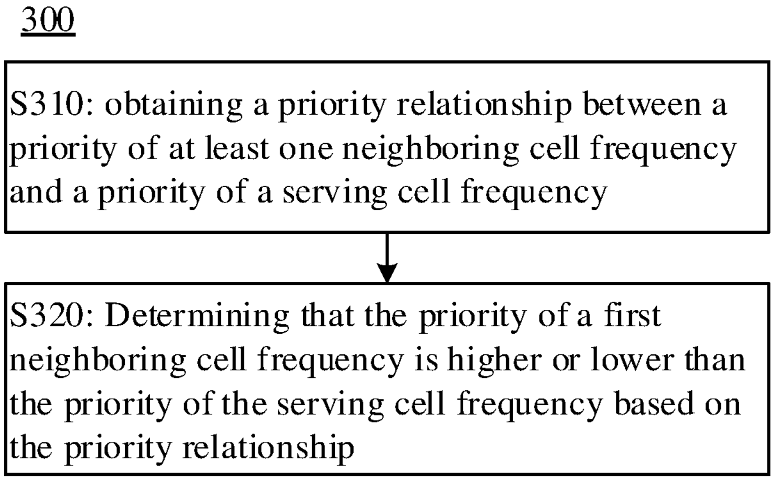
FIG. 3 is a flowchart of a wireless communication method according to an embodiment of the present disclosure.

FIG. 3 is a flowchart of a wireless communication method according to an embodiment of the present disclosure.

At block S310: obtaining, by a terminal device, a priority relationship between a priority of at least one neighboring cell frequency and a priority of a serving cell frequency.

The priority relationship includes the priority of a first neighboring cell frequency being higher or lower than the priority of the serving cell frequency. The first neighboring cell frequency is one of the at least one neighboring cell frequency. That is, the terminal device obtains a relative priority relationship between the at least one neighboring cell frequency and the serving cell frequency.

As an example but not a limitation, the at least one neighboring cell frequency includes one or more of the following neighboring cell frequencies.

A frequency point corresponding to a co-frequency cell belonging to a same radio access technology (RAT) as the serving cell frequency.

A frequency point corresponding to a hetero-frequency cell belonging to the same RAT as the serving cell frequency.

A frequency point corresponding to a co-frequency cell belonging to a different RAT from the serving cell frequency.

A frequency point corresponding to a hetero-frequency cell belonging to a different RAT from the serving cell frequency.

Two cells belonging to the same RAT may be referred to as intra-RAT cells, and two cells belonging to different RATs may be referred to as inter-RAT cells.

As an example but not a limitation, the RAT may include, but is not limited to, at least one of the following.

3G wireless access technology (e.g., CDMA), 4G wireless access technology (e.g., LTE, LTE-A), or fifth generation wireless access technology (e.g., NR).

The terminal device may obtain the priority relationship in a manner that includes, but is not limited to, Mode I and Mode II.

Mode I, the network device sends to the terminal device first configuration information that is configured to indicate the priority relationship between the priority of the at least one neighboring cell frequency and the priority of the serving cell frequency. Accordingly, the terminal device receives the first configuration information and obtains the priority relationship according to the first configuration information.

In some embodiments, the first configuration information is configured through a system broadcast message or dedicated signaling sent by the network device.

For example, the network device may carry the first configuration information through a broadcast system information block (SIB). Alternatively, the network device may carry the first configuration information through a UE-specific RRC message sent to the terminal device, but the present disclosure is not limited thereto.

In an implementation of Mode 1, the first configuration information indicates the priority relationship at a frequency granularity.

The first configuration information may include at least one neighboring cell frequency priority indication information corresponding to the at least one neighboring cell frequency, each neighboring cell frequency priority indication information being configured to indicate that the priority of the corresponding neighboring cell frequency is higher or lower than the priority of the serving cell frequency.

For example, the first configuration information includes neighboring cell frequency priority indication information 1 corresponding to a neighboring cell frequency 1, the neighboring cell frequency priority indication information 1 being configured to indicate that the priority of the neighboring cell frequency 1 is higher than the priority of the serving cell frequency. Alternatively, the neighboring cell frequency priority indication information 1 is configured to indicate that the priority of the neighboring cell frequency 1 is lower than the priority of the serving cell frequency.

In a specific example, the at least one neighboring cell frequency includes N neighboring cell frequencies, and the first configuration information may include N neighboring cell frequency related configuration information. Table 1 provides a schematic list of the contents of the first configuration information. As shown in Table 1, neighboring cell frequency related configuration information 1, 2, . . . , N are included. Each neighboring cell frequency related configuration information includes neighboring cell frequency configuration information for indicating a corresponding neighboring cell frequency. For example, neighboring cell frequency configuration information 1 is configured to indicate a neighboring cell frequency 1, neighboring cell frequency configuration information 2 is configured to indicate a neighboring cell frequency 2, etc. In some embodiments, the neighboring cell frequency configuration information may be configured to indicate the neighboring cell frequency by indicating neighboring cell frequency identification information. For example, the neighboring cell frequency identification information may be an absolute radio frequency channel number (ARFCN), but the present disclosure is not limited thereto.

In addition, each neighboring cell frequency related configuration information may further include neighboring cell frequency priority indication information for indicating that the priority of the corresponding neighboring cell frequency is higher or lower than the priority of the serving cell frequency. For example, the neighboring cell frequency priority indication information 1 is configured to indicate that the priority of the neighboring cell frequency 1 is higher than the priority of the serving cell frequency, alternatively, is configured to indicate that the priority of the neighboring cell frequency 1 is lower than the priority of the serving cell frequency. However, the present disclosure is not limited in this regard.

Since the neighboring cell frequency priority indication information is juxtaposed with the neighboring cell frequency configuration information, or to say, each neighboring cell frequency configuration information corresponds to a neighboring cell frequency priority indication information, it is considered that in this implementation, the neighboring cell frequency priority indication information configures the priority relationship of the frequency points according to the frequency granularity.

TABLE 1

| | |
|---|---|
| Neighboring cell frequency related configuration information 1 | Neighboring cell frequency configuration information 1<br>Absolute frequency priority configuration information 1<br>Neighboring cell frequency priority indication information 1<br>PCI list configuration information 1<br>Other measurement and cell reselection related configuration information 1 |
| Neighboring cell frequency related configuration information 2 | Neighboring cell frequency configuration information 2<br>Absolute frequency priority configuration information 2<br>Neighboring cell frequency priority indication information 2<br>PCI list configuration information 2<br>Other measurement and cell reselection related configuration information 2 |
| . . . | . . . |
| Neighboring cell frequency related configuration information N | . . . |

In some embodiments, as shown in Table 1, each neighboring cell frequency related configuration information may further include absolute frequency priority configuration information corresponding to the neighboring cell frequency for indicating the absolute frequency priority of the neighboring cell frequency. For example, the absolute frequency priority configuration information 1 in the neighboring cell frequency related configuration information 1 is configured to indicate the absolute frequency priority of the neighboring cell frequency 1; when the absolute frequency priority configuration information 1 indicates 5, it is indicated that the absolute frequency priority of the neighboring cell frequency 1 is 5. However, the present disclosure is not limited in this regard. In addition, each neighboring cell frequency related configuration information may further include physical cell identity (PCI) list configuration information corresponding to the neighboring cell frequency for indicating the PCI of the neighboring cell corresponding to the neighboring cell frequency. In addition, each neighboring cell frequency related configuration information may further include other measurement and cell reselection related configuration information.

In some embodiments, the neighboring cell frequency priority indication information may specifically indicate in such a way that when the neighboring cell frequency priority indication information in the first configuration information is set, the priority of the neighboring cell frequency corresponding to the neighboring cell frequency indication information is higher than the priority of the serving cell frequency; alternatively, when the neighboring cell frequency priority indication information in the first configuration information is set, the priority of the neighboring cell frequency corresponding to the neighboring cell frequency indication information is lower than the priority of the serving cell frequency.

The neighboring cell frequency priority indication information may include at least one bit, the network device may indicate whether the neighboring cell frequency priority indication information is set by an indication value of the at least one bit, and the terminal device may determine whether the neighboring cell frequency priority indication information is set based on the indication value of the at least one bit and determine the priority relationship of the frequency points.

For example, the neighboring cell frequency priority indication information occupies one bit, the value of the bit being "1" means that the neighboring cell frequency priority indication information is set, and the value of the bit being "0" means that the neighboring cell frequency priority indication information is not set. When the neighboring cell frequency priority indication information is set to indicate that the priority of the corresponding neighboring cell frequency is higher than the priority of the serving cell frequency, the terminal device receives the first configuration information, where the neighboring cell frequency priority indication information 1 indicates "1", which means that the priority of the neighboring cell frequency priority indication information 1 corresponding to the neighboring cell frequency 1 is higher than the priority of the serving cell frequency. In the first configuration information, when the neighboring cell frequency priority indication information 2 indicates "0", it means that the priority of the neighboring cell frequency priority indication information 2 corresponding to the neighboring cell frequency 2 is lower than the priority of the serving cell frequency. However, the present disclosure is not limited in this regard. Alternatively, the neighboring cell frequency priority indication information is set to indicate that the priority of the corresponding neighboring cell frequency is lower than the priority of the serving cell frequency, and the neighboring cell frequency priority indication information is not set to indicate that the priority of the corresponding neighboring cell frequency is higher than the priority of the serving cell frequency, without limitation in the present disclosure.

For example, the neighboring cell frequency priority indication information occupies one bit, the bit takes the value of "True" to indicate that the neighboring cell frequency priority indication information is set, and the bit takes the value of "False" to indicate that the neighboring cell frequency priority indication information is not set. The neighboring cell frequency priority indication information is set to indicate that the priority of the corresponding neighboring cell frequency is higher than the priority of the serving cell frequency, and is not set to indicate that the priority of the corresponding neighboring cell frequency is lower than the priority of the serving cell frequency. Alternatively, the neighboring cell frequency priority indication information is set to indicate that the priority of the corresponding neighboring cell frequency is lower than the priority of the serving cell frequency, and is not set to indicate that the priority of the corresponding neighboring cell frequency is higher than the priority of the serving cell frequency. The present disclosure is not limited in this regard.

For example, the neighboring cell frequency priority indication information occupies two bits, and when the neighboring cell frequency priority indication information takes the value of '00' or '01' or '10' or '11', it means that the neighboring cell frequency priority indication information is set, where each value corresponds to one meaning; when the corresponding configuration of the neighboring cell frequency priority indication information does not appear, it means that the neighboring cell frequency priority indication information is not set.

For example, the neighboring cell frequency priority indication information is set to indicate that the priority of the corresponding neighboring cell frequency is higher than the priority of the serving cell frequency, and the neighboring cell frequency priority indication information takes the value of '00', '01', '10', '11' may each indicate a level of priority higher than the priority of the serving cell frequency, e.g., '00', '01', '10', and '11' indicate sequentially higher priority levels. When the neighboring cell frequency priority indication information does not appear in the first configuration information, it means that the neighboring cell frequency priority indication information is not set, therefore, the terminal device can determine that the priority of the neighboring cell frequency corresponding to the neighboring cell frequency priority indication information is lower than the priority of the serving cell frequency, but the present disclosure is not limited thereto.

For example, the neighboring cell frequency priority indication information is set to indicate that the priority of the corresponding neighboring cell frequency is lower than the priority of the serving cell frequency, and the neighboring cell frequency priority indication information takes the value of '00', '01', '10', '11' may each indicate a level of priority lower than the priority of the serving cell frequency, e.g., '00', '01', '10', and '11' indicate sequentially lower priority levels. When the neighboring cell frequency priority indication information does not appear in the first configuration information, it means that the neighboring cell frequency priority indication information is not set, therefore, the terminal device can determine that the priority of the neighboring cell frequency corresponding to the neighboring cell frequency priority indication information is higher than the priority of the serving cell frequency, but the present disclosure is not limited thereto.

For example, the neighboring cell frequency priority indication information occupies two bits, and when the neighboring cell frequency priority indication information takes the value of '01' or '10' or '11', it means that the neighboring cell frequency priority indication information is set, where each value corresponds to one meaning, such as each value may indicate a priority level, but the present disclosure is not limited thereto; when the neighboring cell frequency priority indication information takes the value of '00', it means that the neighboring cell frequency priority indication information is not set. However, the present disclosure is not limited in this regard.

It should be noted that the neighboring cell frequency priority indication information occupies one or two bits as an example of the way to indicate the neighboring cell frequency priority indication information, but the present disclosure is not limited to the number of bits occupied by the neighboring cell frequency priority indication information. As well, the way of indicating the frequency priority of the neighboring cell frequency priority indication information may also be other ways.

In another implementation of Mode I, the first configuration information indicates the priority relationship at a PCI granularity.

The first configuration information may include at least one neighboring cell frequency priority indication information, where each neighboring cell frequency priority indication information corresponds to a PCI for indicating that the priority of the neighboring cell frequency corresponding to the corresponding PCI is higher or lower than the priority of the serving cell frequency.

For example, the first configuration information includes neighboring cell frequency priority indication information 1 corresponding to a first PCI, the neighboring cell frequency priority indication information 1 being configured to indicate that the priority of the neighboring cell frequency corresponding to the first PCI is higher than the priority of the serving cell frequency. Alternatively, the neighboring cell frequency priority indication information 1 is configured to indicate that the priority of the neighboring cell frequency corresponding to the first PCI is lower than the priority of the serving cell frequency.

In a specific example, the at least one neighboring cell frequency includes N neighboring cell frequencies, and the first configuration information may include N neighboring cell frequency related configuration information. Table 2 provides another schematic list of the contents of the first configuration information. As shown in Table 2, neighboring cell frequency related configuration information 1, 2, . . . , N are included, each indicating one neighboring cell frequency, respectively. Each neighboring cell frequency related configuration information further includes PCI list configuration information to indicate a PCI of the neighboring cell corresponding to the neighboring cell frequency, and the neighboring cell frequency priority indication information associated with the PCI. For example, the neighboring cell frequency configuration information 1 in the neighboring cell frequency related configuration information 1 is configured to indicate the neighboring cell frequency 1, and the PCI list configuration information 1 in the neighboring cell frequency related configuration information 1 includes PCI1 and associated neighboring cell frequency priority indication information 1, and PCI2 and neighboring cell frequency priority indication information 2. The neighboring cell frequency priority indication information 1 indicates that the priority of the neighboring cell frequency corresponding to the PCI1 is higher than the priority of the serving cell frequency, alternatively, indicates that the priority of the neighboring cell frequency corresponding to the PCI1 is lower than the priority of the serving cell frequency. The neighboring cell frequency priority indication message 2 indicates that the priority of the neighboring cell frequency corresponding to the PCI2 is higher than the priority of the serving cell frequency, alternatively, indicates that the priority of the neighboring cell frequency corresponding to the PCI2 is lower than the priority of the serving cell frequency.

Since the priority indication information is associated with the next-level PCI configuration information of the PCI list configuration information juxtaposed with the neighboring cell frequency configuration information, or to say, each PCI corresponds to a priority indication information, it is considered that in this implementation, the neighboring cell frequency priority indication information configures the priority relationship of the frequency points according to the PCI granularity.

TABLE 2

| | | |
|---|---|---|
| Neighboring cell frequency related configuration information 1 | Neighboring cell frequency configuration information 1 | |
| | Absolute frequency priority configuration information 1 | |
| | PCI list configuration information 1 | PCI1 and associated neighboring cell frequency priority indication information 1 |
| | | PCI2 and associated neighboring cell frequency priority indication information 2 |
| | Other measurement and cell reselection related configuration information 1 | |
| Neighboring cell frequency related configuration information 2 | Neighboring cell frequency configuration information 2 | |
| | Absolute frequency priority configuration information 2 | |
| | PCI list configuration information 2 | PCI3 and associated neighboring cell frequency priority indication information 3 |
| | | PCI4 and associated neighboring cell frequency priority indication information 4 |
| | Other measurement and cell reselection related configuration information 2 | |
| . . . | . . . | |
| Neighboring cell frequency related configuration information N | . . . | |

In some embodiments, as shown in Table 2, each neighboring cell frequency related configuration information may further include absolute frequency priority configuration information corresponding to the neighboring cell frequency for indicating the absolute frequency priority of the neighboring cell frequency. In addition, each neighboring cell frequency related configuration information may further include other measurement and cell reselection related configuration information.

In some embodiments, the neighboring cell frequency priority indication information may specifically indicate in such a way that when the neighboring cell frequency priority indication information in the first configuration information is set, the priority of the neighboring cell frequency corresponding to the neighboring cell frequency indication information is higher than the priority of the serving cell frequency; alternatively, when the neighboring cell frequency priority indication information in the first configuration information is set, the priority of the neighboring cell frequency corresponding to the neighboring cell frequency indication information is lower than the priority of the serving cell frequency.

Specifically, the specific implementation in which this neighboring cell frequency priority indication information is set or not set may be referred to the description in the preceding section and will not be repeated herein for brevity.

In yet another implementation in Mode I, the first configuration information includes configuration information of a neighboring cell of a first type, the configuration information of the neighboring cell of the first type corresponds to one or more neighboring cell frequencies, the one or more neighboring cell frequencies include the neighboring cell frequency 1, and the terminal device may determine, based on the first type, that the priority of the neighboring cell frequency 1 is higher or lower than the priority of the serving cell frequency.

For example, the priority of the neighboring cell frequency corresponding to the neighboring cell of the first type may be specified by the protocol or pre-configured by the network to be higher than the priority of the serving cell frequency. When the terminal device receives the first configuration information, and the first configuration information includes the configuration information of the cell of the first type (or to say, the configuration information of the cell of the first type appears in the first configuration information), such as the configuration information of the first type corresponds to M neighboring cell frequencies, the priority of the M neighboring cell frequencies is higher than the priority of the serving cell frequency. However, the present disclosure is not limited in this regard. Alternatively, the priority of the neighboring cell frequency corresponding to the neighboring cell of the first type may be specified by the protocol to be lower than the priority of the serving cell frequency.

As an example but not a limitation, the neighboring cell of the first type includes at least one of the following cells.

A cell in a terrestrial system, a cell in a non terrestrial system, or a cell in a satellite system.

In a specific example, the neighboring cell of the first type may be a cell in a satellite system, for example, it may be specified by the protocol that when the configuration information of the neighboring cell in the satellite system appears in the first configuration information, the priority of the neighboring cell frequency corresponding to the configuration information of the neighboring cell in the satellite system is higher than the priority of the serving cell frequency. Table 3 provides another schematic list of the contents of the first configuration information. The first configuration information sent by the network device to the terminal device includes terrestrial-system neighboring cell frequency related configuration information and satellite-system neighboring cell frequency related configuration information. After receiving the first configuration information, the terminal device may determine that the priority of the neighboring cell frequency 2 (i.e., the neighboring cell frequency 2 indicated by the neighboring cell frequency configuration information 2) corresponding to the satellite-system neighboring cell frequency related configuration information is higher than the priority of the serving cell frequency based on the fact that the first configuration information includes the satellite-system neighboring cell frequency related configuration information (i.e., the configuration information of the neighboring cell of the first type). However, the present disclosure is not limited in this regard. Alternatively, the priority of the neighboring cell frequency corresponding to the configuration information of the neighboring cell in the satellite system may be specified by the protocol to be higher than the priority of the serving cell frequency, and then the terminal device may determine that the priority of the neighboring cell frequency 2 corresponding to the satellite-system neighboring cell frequency related configuration information is lower than the priority of the serving cell frequency based on the fact that the first configuration information includes the satellite-system neighboring cell frequency related configuration information.

TABLE 3

| | |
|---|---|
| Terrestrial-system neighboring cell frequency related configuration information | Neighboring cell frequency configuration information 1<br>Absolute frequency priority configuration information 1<br>PCI list configuration information 1<br>Other measurement and cell reselection related configuration information 1 |
| Satellite-system neighboring cell frequency related configuration information | Neighboring cell frequency configuration information 2<br>Absolute frequency priority configuration information 2<br>PCI list configuration information 2<br>Other measurement and cell reselection related configuration information 2 |

In some embodiments, the terrestrial-system neighboring cell frequency related configuration information may further include absolute frequency priority configuration information 1 corresponding to the neighboring cell frequency 1 (i.e., the neighboring cell frequency 1 indicated by the neighboring cell frequency configuration information 1), PCI list configuration information 1, and other measurement and cell reselection related configuration information 1. The satellite-system neighboring cell frequency related configuration information may further include absolute frequency priority configuration information 2 corresponding to neighboring cell frequency 2, PCI list configuration information 2, and other measurement and cell reselection related configuration information 2.

It should be noted that Table 3 is illustrated with the terrestrial-system neighboring cell frequency related configuration information corresponding to the neighboring cell frequency 1 and the satellite-system neighboring cell frequency related configuration information corresponding to the neighboring cell frequency 2, but the present disclosure is not limited thereto. The terrestrial-system neighboring cell frequency related configuration information and/or satellite-system neighboring cell frequency related configuration information may further correspond to multiple neighboring cell frequencies according to specific implementation, without limitation herein.

In some embodiments, the first configuration information further includes one or more of the following information.

Band identification information corresponding to the neighboring cell frequency, synchronization measurement timing configuration (SMTC) information corresponding to the neighboring cell frequency, sub-carrier spacing (SCS) configuration information corresponding to the neighboring cell frequency, measurement configuration information corresponding to the neighboring cell frequency or cell reselection related parameters.

The above describes the Mode I of obtaining the frequency priority relationship by the terminal device, i.e., obtaining the frequency priority relationship by receiving the first configuration information from the network device. The network device indicates the relative priority relationship between the neighboring cell frequency and the serving cell frequency through the first configuration information, which can solve the configuration limitation problem caused by the absolute frequency priority. The method can make the configuration more flexible and applicable to a wider range of scenarios by indicating the relative frequency priority relationship.

The following describes the Mode II of the terminal device obtaining the frequency priority relationship.

In Mode II, the terminal device determines the priority relationship between the priority of the at least one neighboring cell frequency and the priority of the serving cell frequency according to a predetermined rule, where the predetermined rule may include, but is not limited to, the following rule 1 and/or rule 2.

Rule 1: in a case where the terminal device supports communication with a cell in a non-terrestrial system, and/or, the terminal device identifies the serving cell as a cell in a non-terrestrial system, the priority of the at least one neighboring cell frequency is higher or lower than the priority of the serving cell frequency.

Rule 2: in a case where the terminal device is a terminal device of a predetermined mobility type, the priority of the at least one neighboring cell frequency is higher or lower than the priority of the serving cell frequency.

The non-terrestrial system may include a satellite system, and the cell in the non-terrestrial system may include a cell in the satellite system.

As an example but not a limitation, the predetermined rule may be specified by a protocol or pre-configured by the network.

For example, it may be specified by the protocol that in the case where the terminal device supports communication with a cell in a non-terrestrial system, or where the terminal device has the capability to communicate with a cell in the a-terrestrial system, the terminal device considers the priority of the neighboring cell frequency to be higher than the priority of the serving cell frequency. Alternatively, it may be provided by the protocol that in the case where the terminal device supports communication with a cell in a non-terrestrial system, or where the terminal device has the capability to communicate with a cell in a non-terrestrial system, the terminal device considers the priority of the at least one neighboring cell frequency to be lower than the priority of the serving cell frequency. However, the present disclosure is not limited in this regard.

Further, for example, it may be specified by the protocol or pre-configured by the network that in a case where the terminal device identifies that the serving cell is a cell in a non-terrestrial system (that is, the terminal device supports communication with a cell in a non-terrestrial system and the terminal device identifies the serving cell as a cell in a non-terrestrial system), the terminal device considers the priority of the neighboring cell frequency to be higher than the priority of the serving cell frequency. Alternatively, it may be specified by the protocol or pre-configured by the network that in the above case, the terminal device considers the priority of the neighboring cell frequency to be lower than the priority of the serving cell frequency. However, the present disclosure is not limited in this regard.

In some embodiments, the terminal device may identify the serving cell as a cell in a non-terrestrial system by, but not limited to, the following methods.

Method 1: the terminal device explicitly or implicitly identifies a cell as a cell in a non-terrestrial system based on cell system information.

For example, as an example of an explicit identification method, a system broadcast message of the cell includes indication information for indicating whether the cell is operating in a non-terrestrial system, and the terminal device may determine that the serving cell is operating in a non-terrestrial system based on the indication information in the system broadcast message of the serving cell. However, the present disclosure is not limited in this regard.

Further, for example, as an example of an implicit identification method, the terminal device may identify that the serving cell is operating in a non-terrestrial system based on frequency, ephemeris information, etc. configured in the system broadcast message of the cell. However, the present disclosure is not limited in this regard.

Method 2: the terminal device implicitly identifies a cell as operating in a non-terrestrial system based on a physical signal search process.

For example, when a frequency point searched by the terminal device belongs to the non-terrestrial system only, the terminal device identifies that the currently searched cell operates in the non-terrestrial system. Alternatively, the terminal device identifies that the currently searched cell operates in a non-terrestrial system based on a specific scrambling code corresponding to the non-terrestrial system or a specific SCS configuration corresponding to the non-terrestrial system, etc. However, the present disclosure is not limited in this regard.

For the predetermined mobility type in Rule 2, in an example, the terminal device of the predetermined mobility type may be a terminal device with higher mobility, which may be specified by the protocol or pre-configured by the network that the terminal device with higher mobility considers the priority of the neighboring cell frequency to be higher than the priority of the serving cell frequency, which may facilitate the mobility control assessment of the terminal device. In some embodiments, the terminal device may be determined to be more mobile based on movement speed of the terminal device, and/or movement frequency (or probability) within a preset time interval compared to a preset threshold. However, the present disclosure is not limited in this regard.

The above describes the Mode II of obtaining the frequency priority relationship by the terminal device, i.e., determining the priority relationship between the frequency priority of the neighboring cell and the frequency priority of the serving cell through the predetermined rule, thereby solving the problem of restricted configuration due to the absolute frequency priority, which improves the flexibility of configuration and applies to a wider range of scenarios.

At block S320: determining, by the terminal device, that the priority of a first neighboring cell frequency is higher or lower than the priority of the serving cell frequency based on the priority relationship.

For example, the terminal device may obtain the frequency priority relationship by receiving the first configuration information from the network device based on the above Mode I. For example, the priority of the neighboring cell frequency may be determined to be higher or lower than the priority of the serving cell frequency based on the neighboring cell frequency priority indication information corresponding to the first neighboring cell frequency. In addition, based on each neighboring cell frequency priority indication information included in the first configuration information, the priority of the corresponding neighboring cell frequency is determined to be higher or lower than the priority of the serving cell frequency. However, the present disclosure is not limited in this regard.

Further, for example, the first neighboring cell frequency belongs to a frequency point corresponding to a neighboring cell of the first type, and the terminal device may determine that the priority of the first neighboring cell frequency is higher or lower than the priority of the serving cell frequency based on whether the configuration information of the neighboring cell of first type appears in the first configuration information. However, the present disclosure is not limited in this regard.

Further, for example, the terminal device may determine that the priority of the neighboring cell frequency is higher or lower than the priority of the serving cell frequency according to the predetermined rule. However, the present disclosure is not limited in this regard.

After determining the relative priority relationship between the at least one neighboring cell frequency and the serving cell frequency, the terminal device may perform a neighboring cell measurement based on the priority relationship between the neighboring cell frequency and the serving cell frequency and determine a target cell for cell selection or cell reselection, provided that a measurement condition is met.

In some embodiments, the terminal device may determine the priority relationship between the at least one neighboring cell frequency based on protocol provisions or based on absolute frequency priority configuration information of the at least one neighboring cell frequency. The absolute frequency priority configuration information is configured to indicate a value or a level of the priority of the neighboring cell frequency.

For example, it may be specified by the protocol that the priority of the frequency point corresponding to the intra-RAT neighboring cell is higher than the priority of the frequency point corresponding to the inter-RAT neighboring cell; and for the intra-RAT neighboring cells, it may be specified that the priority of the frequency point corresponding to a neighboring cell in the intra-RAT neighboring cells that is on the same frequency as the serving cell is higher than the priority of the frequency point corresponding to a neighboring cell in the intra-RAT neighboring cells that is on a different frequency from the serving cell; for the inter-RAT neighboring cells, it may be specified that the priority of the frequency point corresponding to a neighboring cell in the inter-RAT neighboring cells that is on the same frequency as the serving cell is higher than the priority of the frequency point corresponding to a neighboring cell in the inter-RAT neighboring cells that is on the different frequency from the serving cell. The terminal device may determine the priority relationship between the neighboring cell frequencies in the at least one neighboring cell frequency based on the above provisions, but the present disclosure is not limited thereto.

Further, for example, the terminal device may determine the priority relationship between the neighboring cell frequencies in the at least one neighboring cell frequency based on the absolute frequency priority of the at least one neighboring cell frequency, i.e., a frequency priority level indicated by the corresponding absolute frequency priority configuration information. For example, the neighboring cell frequency 1 corresponds to the absolute frequency priority 6, the neighboring cell frequency 2 corresponds to the absolute frequency priority 3, the neighboring cell frequency 3 corresponds to the absolute frequency priority 1. Then the terminal device can determine based on the absolute frequency priority rule (i.e., the higher the priority level value the higher the priority), that the priority of neighboring cell frequency 1 is higher than the priority of the neighboring cell frequency 2, and the priority of the neighboring cell frequency 2 is higher than the priority of the neighboring cell frequency 3. However, the present disclosure is not limited in this regard.

Based on the scheme of the present disclosure, the terminal device obtains the relative priority relationship between the neighboring cell frequency and the serving cell frequency, such as obtaining the priority of the neighboring cell frequency higher or lower than the priority of the serving cell frequency, performs the neighboring cell measurement when the measurement condition is met and based on the obtained relative priority relationship of the frequency points, and determines the target cell for cell selection or cell reselection, thereby solving the problem of restricted configuration due to the absolute frequency priority, which improves the flexibility of configuration and applies to a wider range of scenarios.

The above describes the method provided by the embodiments of the present disclosure in detail in conjunction with FIG. 2. The following describes an apparatus provided by the embodiments of the present disclosure.

Figure 4:
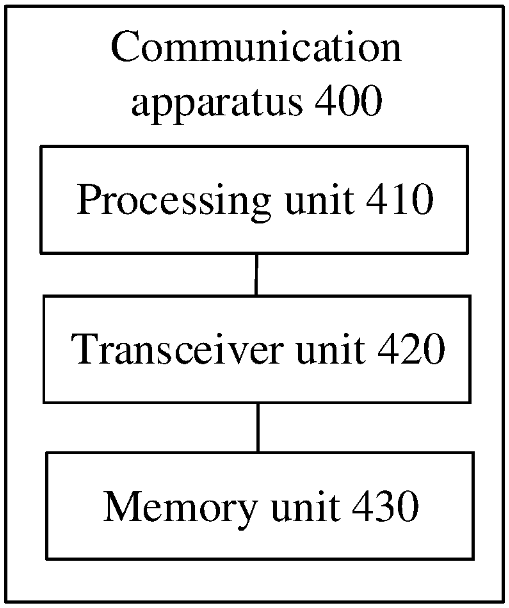
FIG. 4 is a schematic block view of a communication apparatus according to an embodiment of the present disclosure.

FIG. 4 is a schematic block view of a communication apparatus according to an embodiment of the present disclosure. As illustrated in FIG. 4, the communication apparatus 400 may include a processing unit 410 and a transceiver unit 420.

In a possible design, the communication apparatus 400 may correspond to the terminal device, i.e., UE, in the method embodiments above, or to a chip configured in (or for use in) the terminal device.

It should be understood that the communication apparatus 400 may correspond to the terminal device in the method 200 according to the embodiments of the present disclosure, and that the communication apparatus 400 may include units for performing the method performed by the terminal device in the method 200 of FIG. 2. Moreover, each unit in the communication apparatus 400 and the other operations and/or functions described above are respectively intended to implement the corresponding process of the method 200 of FIG. 2.

In a possible implementation, the transceiver unit 420 is configured to receive the first configuration information from the network device, which may also be called an obtaining unit. The processing unit 410 is configured to determine that the priority of the first neighboring cell frequency is higher or lower than the priority of the serving cell frequency based on the relative priority relationship of the neighboring cell frequencies.

In another possible implementation, the communication apparatus 400 may further include an obtaining unit, which is configured to obtain the priority relationship between the priority of the at least one neighboring cell frequency and the priority of the serving cell frequency according to the predetermined rule. The processing unit 410 is configured to determine that the priority of the first neighboring cell frequency is higher or lower than the priority of the serving cell frequency according to the priority relationship.

It should also be understood that when the communication apparatus 400 is a chip configured in (or used in) a terminal device, the transceiver unit 420 in the communication apparatus 400 may be an input/output interface or a circuit of the chip, and the processing unit 410 in the communication apparatus 400 may be a processor in the chip.

In some embodiments, the processing unit 410 of the communication apparatus 400 may be configured to process instructions or data to achieve corresponding operations.

In some embodiments, the communication apparatus 400 may further include a memory unit 430, which may be configured to store instructions or data, and the processing unit 410 may execute the instructions or data stored in the storage unit to enable the communication apparatus to achieve the corresponding operations. The transceiver unit 420 in the communication apparatus 400 may correspond to the transceiver 510 in the terminal device 500 illustrated in FIG. 5, and the memory unit 430 may correspond to the memory in the terminal device 500 illustrated in FIG. 5.

It should be understood that the specific processes by which each unit performs the corresponding steps described above have been described in detail in the method embodiments and will not be repeated herein for the sake of brevity.

Figure 5:
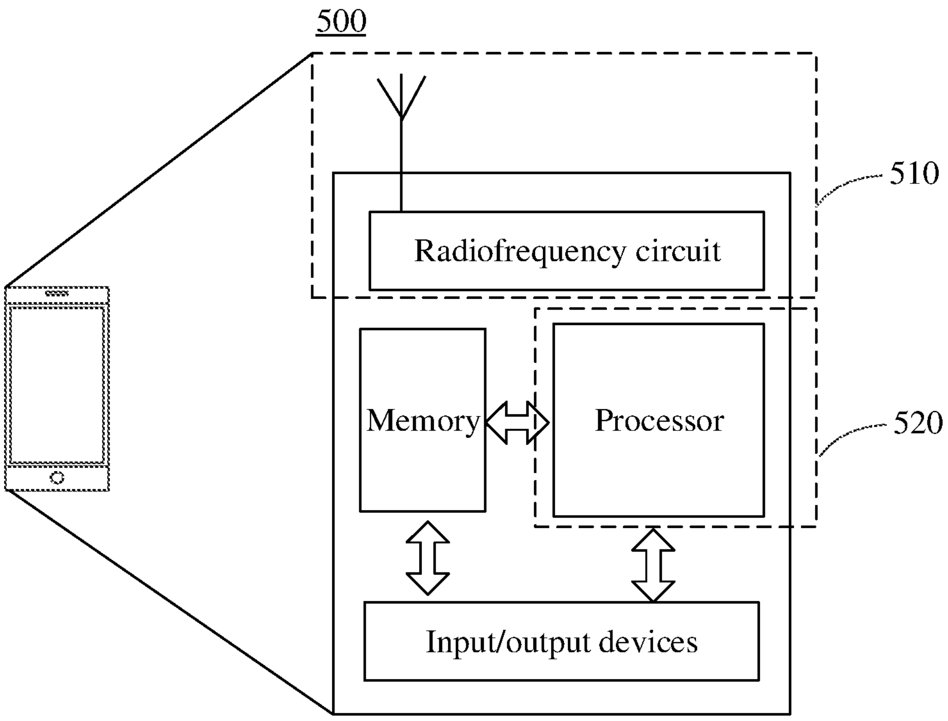
FIG. 5 is a structural schematic view of a terminal device according to an embodiment of the present disclosure.

It should also be understood that when the communication apparatus 400 is a terminal device, the transceiver unit 420 in the communication apparatus 400 may be implemented through a communication interface (such as a transceiver or an input/output interface), for example, corresponding to the transceiver 510 in the terminal device 500 illustrated in FIG. 5, and the processing unit 410 in the communication apparatus 400 may be implemented through at least one processor, for example, corresponding to the processor 520 in the terminal device 500 illustrated in FIG. 5. The processing unit 410 in the communication apparatus 400 may be implemented by at least one logic circuit.

In another possible design, the communication apparatus 400 may correspond to the network device in the method embodiments above, for example, or to a chip configured in (or for use in) the network device.

It should be understood that the communication apparatus 400 may correspond to the network device in the method 200 according to the embodiments of the present disclosure, and that the communication apparatus 400 may include units for performing the method performed by the network device in the method 200 of FIG. 2. Moreover, each unit in the communication apparatus 400 and the other operations and/or functions described above are respectively intended to implement the corresponding process of the method 200 in FIG. 2.

It should also be understood that when the communication apparatus 400 is a chip configured in (or used in) a network device, the transceiver unit 420 in the communication apparatus 400 is an input/output interface or a circuit in the chip, and the processing unit 410 in the communication apparatus 400 may be a processor in the chip.

In some embodiments, the processing unit 410 of the communication apparatus 400 may be configured to process instructions or data to achieve corresponding operations.

In some embodiments, the communication apparatus 400 may further include a memory unit 430, which may be configured to store instructions or data, and the processing unit may execute the instructions or data stored in the memory unit 430 to enable the communication apparatus to achieve the corresponding operations. The memory unit 430 in the communication apparatus 400 is a memory that may correspond to the memory in the network device 600 illustrated in FIG. 6.

It should be understood that the specific process by which each unit performs the corresponding steps described above is described in detail in the method embodiments and will not be repeated herein for the sake of brevity.

Figure 6:
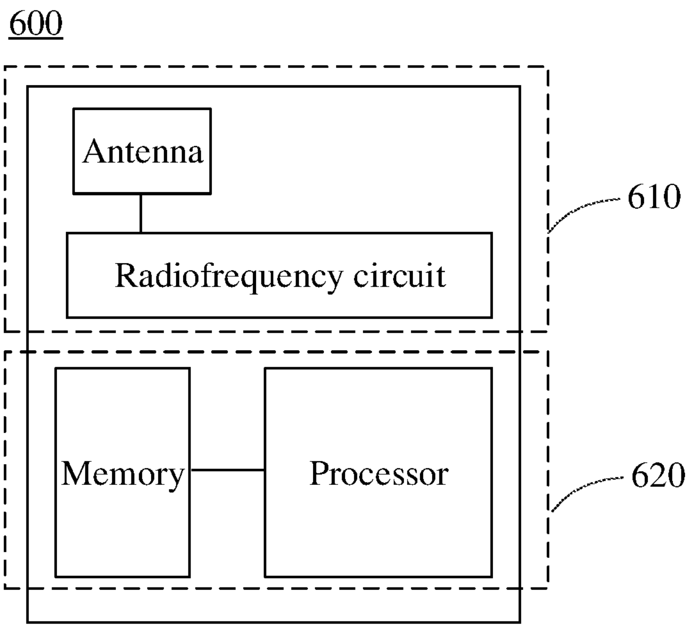
FIG. 6 is a structural schematic view of a network device according to an embodiment of the present disclosure.

It should also be understood that when the communication apparatus 400 is a network device, the transceiver unit 420 in the communication apparatus 400 may be implemented through a communication interface (e.g., a transceiver or an input/output interface), for example, corresponding to the transceiver 610 in the network device 600 illustrated in FIG. 6, and the processing unit 410 in the communication apparatus 400 may be implemented through at least one processor, for example, corresponding to the processor 620 in the network device 600 illustrated in FIG. 6. The processing unit 410 in the communication apparatus 400 may be implemented by at least one logic circuit.

FIG. 5 is a structural schematic view of a terminal device according to an embodiment of the present disclosure. The terminal device 500 may be applied in the system as shown in FIG. 1 to perform the functions of the terminal device in the method embodiments described above. As shown, the terminal device 500 includes a processor 520 and a transceiver 510. In some embodiments, the terminal device 500 further includes a memory. The processor 520, the transceiver 510, and the memory may communicate with each other through an internal connection path to transmit control and/or data signals, the memory is configured to store a computer program, and the processor 520 is configured to execute the computer program in the memory to control the transceiver 510 to send and receive signals.

The processor 520 and the memory may be combined into a processing apparatus, and the processor 520 is configured to execute the program code stored in the memory to achieve the above functions. The memory may be integrated in the processor 520 or be independent of the processor 520 when specifically implemented. The processor 520 may correspond to the processing unit in FIG. 4.

The transceiver 510 may correspond to the transceiver unit in FIG. 4. The transceiver 510 may include a receiver (or receiving machine, receiving circuit) and a transmitter (or transmitting machine, transmitting circuit). The receiver is configured to receive signals and the transmitter is configured to transmit signals.

It should be understood that the terminal device 500 shown in FIG. 5 is capable of implementing the various processes in the embodiments of method 200 in FIG. 2 involving a terminal device. The operations and/or functions of the individual modules in the terminal device 500, respectively, are to implement the corresponding processes in the method embodiments described above. Specific reference may be made to the descriptions in the above method embodiments, and the detailed descriptions are appropriately omitted herein to avoid repetition.

The processor 520 may be configured to perform actions described in the above method embodiments as implemented internally by the terminal device, while the transceiver 510 may be configured to perform actions described in the above method embodiments as sent by the terminal device to or received from the network device. Reference may be made to the description in the method embodiments for details, which will not be repeated herein.

In some embodiments, the terminal device 500 may further include a power supply for providing power to various components or circuits in the terminal device.

In addition, in order to make the terminal device more functional, the terminal device 500 may further include one or more of an input unit, a display unit, an audio circuit, a camera, and a sensor, etc. The audio circuit may further include a speaker, a microphone, etc.

FIG. 6 is a structural schematic view of a network device according to an embodiment of the present disclosure. The network device 600 may be applied to the system as shown in FIG. 1 to perform the functions of the network device in the method embodiments described above. As shown, the network device 600 includes a processor 620 and a transceiver 610. In some embodiments, the network device 600 further includes a memory. The processor 620, the transceiver 610, and the memory may communicate with each other through an internal connection path to transmit control and/or data signals, the memory is configured to store a computer program, and the processor 620 is configured to execute the computer program in the memory to control the transceiver 610 to send and receive signals.

It should be understood that the network device 600 shown in FIG. 6 is capable of implementing the various processes in the method 200 of FIG. 2 involving a network device. The operations and/or functions of the individual modules in the network device 600, respectively, are to implement the corresponding processes in the method embodiments described above. Specific reference may be made to the descriptions in the method embodiments, and the detailed descriptions are appropriately omitted herein to avoid repetition.

It should be understood that the network device 600 shown in FIG. 6 is only one possible architecture of the network device and should not constitute any limitation to the present disclosure. The methods provided in the present disclosure may be applicable to network devices of other architectures, such as network devices containing CU, DU, AAU, etc. The present disclosure is not limited to the specific architecture of the network device.

Embodiments of the present disclosure further provide a processing apparatus including a processor and an interface. The processor is configured to perform the method in any of the method embodiments described above.

It should be understood that the processing apparatus may be one or more chips. For example, the processing apparatus may be a field programmable gate array (FPGA), may be an application specific integrated circuit (ASIC), a system on chip (SoC), a central processor unit (CPU), a network processor (NP), a digital signal processor (DSP), a micro-controller unit (MCU), a programmable logic device (PLD), or other integrated chips.

In the process of implementation, the steps of the above method may be accomplished by integrated logic circuits in the hardware of the processor or by instructions in the form of software. The steps of the method disclosed in conjunction with the embodiments of the present disclosure may be performed directly by the hardware processor, or by a combination of hardware and software modules in the processor. The software module may be located in random memory, flash memory, read-only memory, programmable read-only memory or electrically rewritable programmable memory, registers, and other storage medium well established in the art. The storage medium is located in the memory, and the processor reads the information in the memory and completes the steps of the above method in combination with its hardware. To avoid repetition, it will not be described in detail herein.

It should be noted that the processor in the present embodiments may be an integrated circuit chip with the processing capability of signals. During implementation, the steps of the above method embodiments may be accomplished by integrated logic circuitry in the hardware in the processor or by instructions in the form of software. The processor may be a general-purpose processor, a digital signal processor (DSP), an application-specific integrated circuit (ASIC), a field-programmable gate array (FPGA) or other programmable logic devices, a discrete gate or transistor logic device, or a discrete hardware component, for implementing or performing respective methods, steps, and logical block diagrams of the disclosure in the present disclosure embodiment. The general-purpose processor may be a microprocessor or the processor may also be any conventional processor, etc. The steps of the method disclosed in conjunction with the embodiments of the present disclosure may be directly embodied as performed by the hardware decode processor or performed with a combination of hardware and software modules in the decode processor. The software module may be located in random memory, flash memory, read-only memory, programmable read-only memory or electrically rewritable programmable memory, registers, and other storage medium well established in the art. The storage medium is located in the memory, and the processor reads the information in the memory and completes the steps of the above method in combination with its hardware.

Based on the method provided by the embodiments of the present disclosure, the present disclosure further provides a computer program product including a computer program code. When executed by one or more processors, the computer program code causes an apparatus including the processors to perform the method of the above-described embodiments.

Based on the method provided by embodiments of the present disclosure, the present disclosure further provides a computer-readable storage medium, the computer-readable storage medium storing program code. When the program code is run by one or more processors, an apparatus including the processors is caused to perform the method of the above-described embodiments.

Based on the method provided by the embodiments of the present disclosure, the present disclosure further provides a system including one or more of the aforementioned network devices. The system may further include one or more of the aforementioned terminal devices.

In the several embodiments provided in the present disclosure, it should be understood that the disclosed apparatus and method, may be implemented in other ways. For example, the above apparatus embodiments are merely schematic, e.g., the division of the modules, which is only a logical functional division, may be divided in another way when actually implemented. For example, multiple modules may be combined or may be integrated into another system, or some features may be ignored, or not implemented. In addition, the mutual coupling or direct coupling or communication connection shown or discussed may be through some interface, indirect coupling of the modules, or communication connection, which may be electrical, mechanical or other forms.

The above mentioned is only a specific implementation of the present disclosure, but the scope of the present disclosure is not limited to it. Any person skilled in the art who can easily think of variations or substitutions within the technical scope disclosed by the present disclosure shall be covered by the scope of the present disclosure. Therefore, the scope of the present disclosure shall be subject to the scope of the claims.

What is claimed is:

1. A frequency priority configuration method, comprising:

receiving, by a terminal device, first configuration information from a network device, wherein the first configuration information is configured to indicate a relative priority relationship between a priority of at least one neighboring cell frequency and a priority of a serving cell frequency;

wherein the relative priority relationship comprises a priority of a first neighboring cell frequency being higher or lower than the priority of the serving cell frequency, the at least one neighboring cell frequency comprising the first neighboring cell frequency; and the first configuration information indicates the relative priority relationship at a physical cell identity (PCI) granularity; the first configuration information comprises first indication information configured to directly indicate that a priority of a frequency corresponding to a first PCI is higher or lower than the priority of the serving cell frequency; the first neighboring cell frequency is the frequency corresponding to the first PCI.

2. The method according to claim 1, wherein, in response to the first indication information in the first configuration information being set, the priority of the first neighboring cell frequency corresponding to the first indication information is higher than the priority of the serving cell frequency; or, in response to the first indication information in the first configuration information being set, the priority of the first neighboring cell frequency corresponding to the first indication information is lower than the priority of the serving cell frequency.

3. The method according to claim 1, wherein the first configuration information comprises one or more of:

neighboring cell frequency identification information, PCI list configuration information corresponding to a neighboring cell frequency, frequency priority configuration information corresponding to the neighboring cell frequency, band identification information corresponding to the neighboring cell frequency, synchronization measurement timing configuration (SMTC) information corresponding to the neighboring cell frequency, sub-carrier spacing (SCS) configuration information corresponding to the neighboring cell frequency, measurement configuration information corresponding to the neighboring cell frequency or cell reselection related parameters.

4. The method according to claim 1, wherein the first configuration information is configured through a system broadcast message or dedicated signaling.

5. The method according to claim 1, wherein the at least one neighboring cell frequency comprises one or more of:

a frequency point corresponding to a co-frequency cell belonging to a same radio access technology (RAT) as the serving cell frequency;

a frequency point corresponding to a hetero-frequency cell belonging to a same RAT as the serving cell frequency;

a frequency point corresponding to a co-frequency cell belonging to a different RAT from the serving cell frequency; and a frequency point corresponding to a hetero-frequency cell belonging to a different RAT from the serving cell frequency.

6. The method according to claim 1, further comprising:

determining, by the terminal device, a priority relationship between the at least one neighboring cell frequency based on protocol provisions or based on absolute frequency priority configuration information of the at least one neighboring cell frequency;

wherein the absolute frequency priority configuration information is configured to indicate a value of the priority of a neighboring cell frequency.

7. The method according to claim 1, further comprising:

in response to a measurement condition being met, performing, by the terminal device, a neighboring cell measurement according to the relative priority relationship between the priority of the at least one neighboring cell frequency and the priority of the serving cell frequency and/or a priority relationship between the at least one neighboring cell frequency, and determining, by the terminal device, a target cell for cell selection or cell reselection.

8. A frequency priority configuration method, comprising:

sending first configuration information to a terminal device, wherein the first configuration information is configured to indicate a relative priority relationship between a priority of at least one neighboring cell frequency and a priority of a serving cell frequency;

wherein the relative priority relationship comprises a priority of a first neighboring cell frequency being higher or lower than the priority of the serving cell frequency, the at least one neighboring cell frequency comprising the first neighboring cell frequency; and the first configuration information indicates the relative priority relationship at a physical cell identity (PCI) granularity: the first configuration information comprises first indication information configured to directly indicate that a priority of a frequency corresponding to a first PCI is higher or lower than the priority of the serving cell frequency; the first neighboring cell frequency is the frequency corresponding to the first PCI.

9. The method according to claim 8, wherein, in response to the first indication information in the first configuration information being set, the priority of the first neighboring cell frequency corresponding to the first indication information is higher than the priority of the serving cell frequency; or, in response to the first indication information in the first configuration information being set, the priority of the first neighboring cell frequency corresponding to the first indication information is lower than the priority of the serving cell frequency.

10. The method according to claim 8, wherein the first configuration information comprises one or more of:

neighboring cell frequency identification information, PCI list configuration information corresponding to a neighboring cell frequency, frequency priority configuration information corresponding to the neighboring cell frequency, band identification information corresponding to the neighboring cell frequency, synchronization measurement timing configuration (SMTC) information corresponding to the neighboring cell frequency, sub-carrier spacing (SCS) configuration information corresponding to the neighboring cell frequency, measurement configuration information corresponding to the neighboring cell frequency or cell reselection related parameters.

11. The method according to claim 8, wherein the at least one neighboring cell frequency comprises one or more of:

a frequency point corresponding to a co-frequency cell belonging to a same radio access technology (RAT) as the serving cell frequency;

a frequency point corresponding to a hetero-frequency cell belonging to a same RAT as the serving cell frequency;

a frequency point corresponding to a co-frequency cell belonging to a different RAT from the serving cell frequency; and a frequency point corresponding to a hetero-frequency cell belonging to a different RAT from the serving cell frequency.

12. A terminal device, comprising a memory and a processor; wherein the memory stores an instruction; the instruction is executable by the processor to cause the processor to perform:

receiving first configuration information from a network device, wherein the first configuration information is configured to indicate a relative priority relationship between a priority of at least one neighboring cell frequency and a priority of a serving cell frequency;

wherein the relative priority relationship comprises a priority of a first neighboring cell frequency being higher or lower than the priority of the serving cell frequency, the at least one neighboring cell frequency comprising the first neighboring cell frequency; and the first configuration information indicates the relative priority relationship at a physical cell identity (PCI) granularity; the first configuration information comprises first indication information configured to directly indicate that a priority of a frequency corresponding to a first PCI is higher or lower than the priority of the serving cell frequency; the first neighboring cell frequency is the frequency corresponding to the first PCI.

13. The terminal device according to claim 12, wherein, in response to the first indication information in the first configuration information being set, the priority of the first neighboring cell frequency corresponding to the first indication information is higher than the priority of the serving cell frequency; or, in response to the first indication information in the first configuration information being set, the priority of the first neighboring cell frequency corresponding to the first indication information is lower than the priority of the serving cell frequency.

14. The terminal device according to claim 12, wherein the first configuration information comprises one or more of:

neighboring cell frequency identification information, PCI list configuration information corresponding to a neighboring cell frequency, frequency priority configuration information corresponding to the neighboring cell frequency, band identification information corresponding to the neighboring cell frequency, synchronization measurement timing configuration (SMTC) information corresponding to the neighboring cell frequency, sub-carrier spacing (SCS) configuration information corresponding to the neighboring cell frequency, measurement configuration information corresponding to the neighboring cell frequency or cell reselection related parameters.

15. The terminal device according to claim 12, wherein the first configuration information is configured through a system broadcast message or dedicated signaling.

16. The terminal device according to claim 12, wherein the at least one neighboring cell frequency comprises one or more of:

a frequency point corresponding to a co-frequency cell belonging to a same radio access technology (RAT) as the serving cell frequency;

a frequency point corresponding to a hetero-frequency cell belonging to a same RAT as the serving cell frequency;

a frequency point corresponding to a co-frequency cell belonging to a different RAT from the serving cell frequency; and a frequency point corresponding to a hetero-frequency cell belonging to a different RAT from the serving cell frequency.

17. The terminal device according to claim 12, wherein the instruction is executable by the processor to cause the processor to further perform:

determining a priority relationship between the at least one neighboring cell frequency based on protocol provisions or based on absolute frequency priority configuration information of the at least one neighboring cell frequency;

wherein the absolute frequency priority configuration information is configured to indicate a value of the priority of a neighboring cell frequency.

18. The terminal device according to claim 12, wherein the instruction is executable by the processor to cause the processor to further perform:

in response to a measurement condition being met, performing a neighboring cell measurement according to the relative priority relationship between the priority of the at least one neighboring cell frequency and the priority of the serving cell frequency and/or a priority relationship between the at least one neighboring cell frequency, and determining a target cell for cell selection or cell reselection.

* * * * *